United States Patent [19]
Jitsuno et al.

[11] Patent Number: 5,729,344
[45] Date of Patent: Mar. 17, 1998

[54] METHOD AND APPARATUS FOR FORMING AN OPTICAL SURFACE BY OPTICAL ETCHING

[75] Inventors: Takahisa Jitsuno, Mino; Nobuaki Nakashima, Suita; Masahiro Nakatsuka, Ikoma; Keiu Tokumura, Osaka, all of Japan

[73] Assignee: Nippon Aspherical Lens Co., Ltd., Osaka, Japan

[21] Appl. No.: 626,423

[22] Filed: Apr. 2, 1996

[30] Foreign Application Priority Data

Apr. 10, 1995 [JP] Japan .................. 7-083604

[51] Int. Cl.$^6$ .................................. G01B 9/02
[52] U.S. Cl. .................................. 356/359
[58] Field of Search .................. 356/359, 360, 356/357, 358, 345

[56] References Cited

U.S. PATENT DOCUMENTS 1,565,533  12/1925  Twyman et al. .................. 356/360

Primary Examiner—Samuel A. Turner
Attorney, Agent, or Firm—Nikaido, Marmelstein, Murray & Oram LLP

[57] ABSTRACT

The invention counterbalances the defects of optical glass and optical plastic so as to realize a high precision aspherical processing. The optical lens 1 includes a matrix 2 of optical glass and a coating of optical resin material applied to the surface of the matrix 2. A reflective wavefront of a lens plane 4 of the optical lens 1 is measured by means of a interferometer 5. The wavefront from the interferometer 5 is monitored by a computer system 7 to provide monitoring information. The lens plane 4 is irradiated or scanned with a short wavelength, ultraviolet laser beam L in accordance with the monitoring information, whereby the lens plane 4 is processed with the ultraviolet laser beam in non-contact manner into a shape to provide a most appropriate reflective wavefront.

8 Claims, 2 Drawing Sheets

METHOD AND APPARATUS FOR FORMING AN OPTICAL SURFACE BY OPTICAL ETCHING

BACKGROUND OF THE INVENTION

1. Field of the Invention

This invention relates to a method for processing an optical plane, and more particularly to a method for processing an optical plane which enables high precision production of lenses, mirrors or the like which are needed in certain application field (cameras, measuring instrument, laser printers or the like) requiring a high-quality optical lens, or in projectors, large-sized laser devices and lithography devices requiring an optical element of an increased aperture.

2. Description of the Prior Art

A high precision optical lens or reflecting mirror is required, for example In a laser device for precision processing, in order to condense a laser beam at a minute spot. Typically, such optical elements (referred to as "optical lens" hereinbelow) may include those consisting of optical glass and those consisting of optical plastic.

With an optical lens solely consisting of optical glass or optical plastic, the shape of configuration of its optical plane (referred to as "lens plane" hereinbelow) greatly influences the condensing characteristics for laser beams. Specifically, and when a particular optical lens includes wavefront aberration, a converged spot size of laser beam is increased, so as to decrease condensing intensity, even when the laser beam incident to such optical lens includes a parallel wavefront.

It is therefore necessary for such optical lens to have a lens plane causing a laser beam condensed at a point to have a minimum spot size. Thus, such lens plane is conventionally formed by an aspheric processing explained below. In the case of an optical lens consisting of optical plastic, the above aspheric processing is performed by means of mechanical cutting or molding within a die. In the case of an optical lens consisting of optical glass, the above aspheric processing is performed by means of polishing or melt-pressing of glass.

With regard to an optical lens solely consisting of optical plastic, the above high precision aspherical processing may be easily performed, but it provides increased optical strain, as well as variance in focal distance due to temperature difference. The above optical lens also experiences significant influence due to thermal expansion. Furthermore, the above optical lens varies in refractive index since it absorbs a quantity of moisture after a period of time, so as to cause change in focal length. Thus, such optical lens solely consisting of optical plastic is not preferred.

On the contrary, an optical lens solely consisting of optical glass presents less optical strain during the aspheric processing, and does not suffer from temperature change and thermal expansion, as well as aging affects. Thus, such optical lens is preferred. It is noted however that aspheric processing per se is very difficult to be performed relative to the optical lens solely consisting of optical glass. Such processing requires a substantial degree of skill for an operator. It also requires repetitive inspection operations relative to a surface condition of the lens each time it is processed. Thus, it is time-consuming for performing such processing operation. Thus, it is difficult to realize high precision aspherical processing.

SUMMARY OF THE INVENTION

In order to solve the above problems, the present invention is to provide a method which counterbalances the defects of optical glass and optical plastic so as to realize high precision aspherical processing of a lens plane.

In accordance with the invention, it is possible to form an optical plane into a shape to provide a most appropriate transmissive wavefront or reflective wavefront, the optical plane being a surface of a coating of optical resin material applied to a surface of a matrix of optical glass, or a surface of a matrix of optical glass or fused quartz.

In accordance with one embodiment of the invention, a transmissive wavefront or reflective wavefront of an optical plane is monitored to provide monitoring information. The optical plane is a surface of a coating of optical resin material applied to a surface of a matrix of optical glass, or a surface of a matrix of optical glass or fused quartz. The optical plane is irradiated with a short wavelength, ultraviolet laser beam in accordance with the monitoring information, so as to be etched in non-contact manner. Thus, the optical plane is formed into a shape to provide a most appropriate transmissive wavefront or reflective wavefront.

In accordance with the method of forming a lens plane into a desired shape according to the invention, an optical plane of a coating of optical resin material applied to a surface of a matrix of optical glass is to be processed or an optical plane of a matrix of optical glass or fused quartz is processed. Thus, reduced optical strain and increased optical characteristics may be obtained during the aspheric processing, owing to the advantageous properties of the optical glass. When an optical plane of a coating of optical resin material is processed, high precision aspherical processing may be realized, owing to the advantageous properties of the optical resin material.

A transmissive wavefront or reflective wavefront of the optical plane is monitored to provide monitoring information. Then, the optical plane is irradiated with a short wavelength, ultraviolet laser beam in accordance with the monitoring information so as to be etched in non-contact manner. Thus, a most appropriate transmissive wavefront or reflective wavefront may be set at a desired value on real time basis. A smooth surface may be obtained after etching operation, owing to the advantageous properties of the short wavelength, ultraviolet laser beam.

DETAILED DESCRIPTION OF PREFERRED EMBODIMENTS

Figure 1:
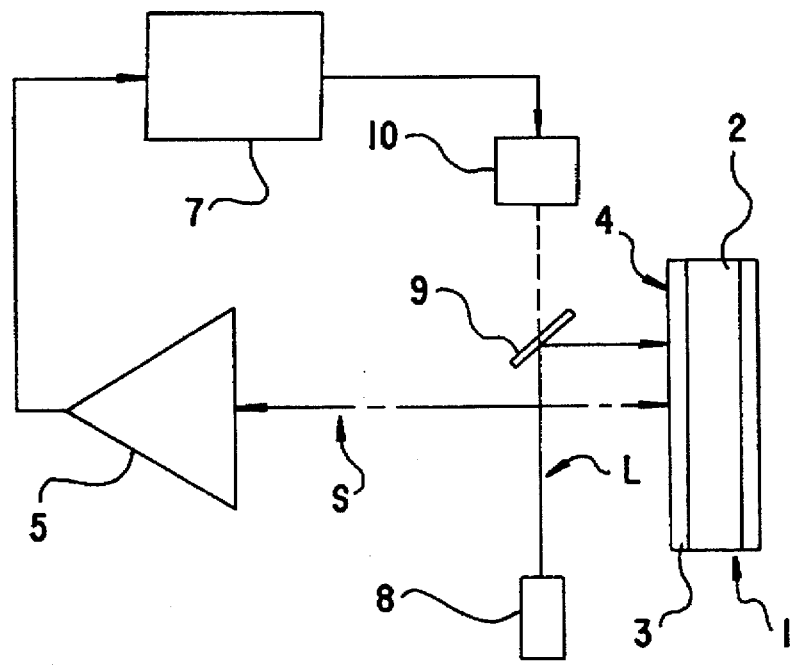
FIG. 1 is a schematic representation of a device for monitoring a reflective wavefront of a lens plane according to one embodiment of the invention which is applied to an optical plane constituted by a coating of an optical resin material.
Figure 2:
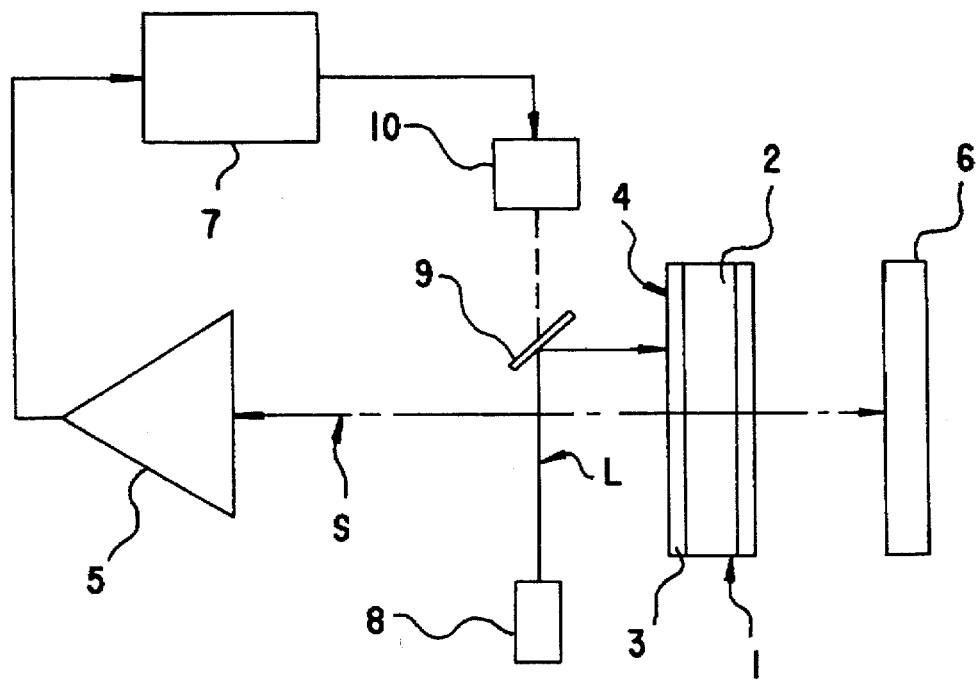
FIG. 2 is a schematic representation of a device for monitoring a transmissive wavefront of the lens plane according to above embodiment of the invention which is applied to the optical plane constituted by a coating of an optical resin material.
Figure 3:
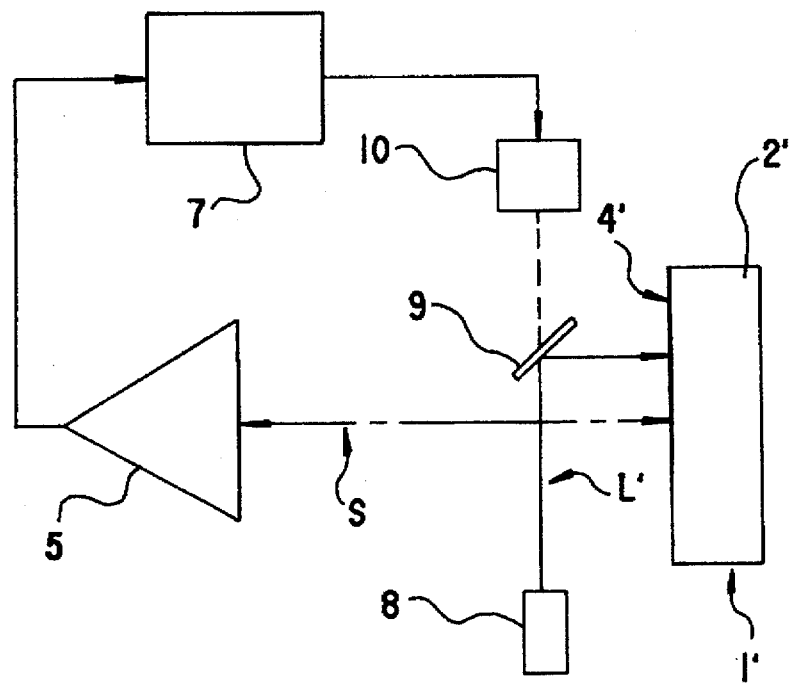
FIG. 3 is a schematic representation of a device for monitoring a reflective wavefront of a lens plane according to another embodiment of the invention which is applied to an optical plane constituted by a matrix of optical glass or fused quartz.
Figure 4:
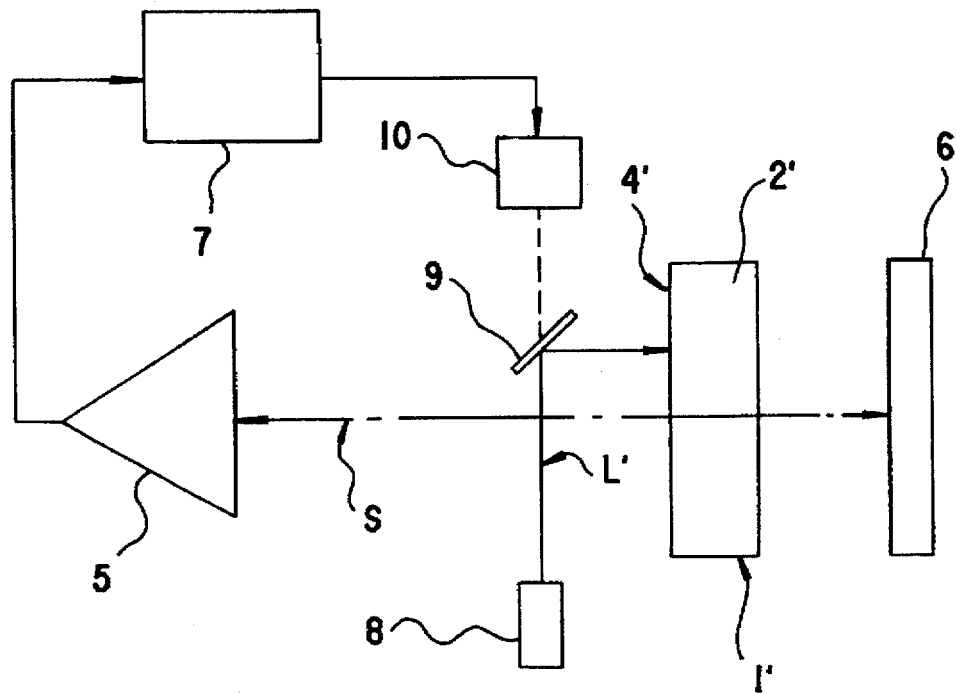
FIG. 4 is a schematic representation of a device for monitoring a transmissive wavefront of the lens plane according to the FIG. 3 embodiment of the invention which is applied to the optical plane constituted by a matrix of optical glass or fused quartz.

Several embodiments of the method for forming a lens plane according to the invention will be explained below with reference to FIGS. 1 through 4. FIGS. 1 and 2 illustrate one embodiment in which an optical plane is formed by applying a coating of optical resin material on each surface of a matrix formed from optical glass. FIGS. 3 and 4 illustrate another embodiment in which an optical plane is directly made from optical glass or fused quartz constituting a matrix. FIGS. 1 and 3 show a case in which a reflective wavefront of the lens planes in each embodiment is monitored, while, FIGS. 2 and 4 show a case in which a wave transmitting surface of the lens planes in each embodiment is monitored.

As illustrated in FIG. 1 or 3, an optical lens 1 or 1', an object to be worked, is positioned and fixedly supported by an appropriate means. The optical lens 1 shown in FIG. 1 includes a matrix 2 of optical glass such as BK7, and an optical resin material 3, such as polymethyl methacrylate (PMMA) or polycarbonate.

The optical resin material 3 is coated on each surface of the matrix 2 to the thickness of several microns or several millimeters. Contrariwise, the optical lens 1' shown in FIG. 3 is simply constructed by a matrix 2' of optical glass or fused quartz.

An interferometer 5 Is disposed at a position opposite to a lens plane 4 or 4' to be worked of the optical lens 1 or 1'. A mirror 6 is disposed at a position opposite to and behind the optical lens 1 or 1'. That is to say, the mirror 6 is disposed on a side opposite to the interferometer with regard to the lens 1 or 1'.

The Interferometer 5 is connected with a computer system 7. The interferometer 5 includes an optical system and a CCD camera. The optical system includes a light source, such as a He-Ne laser emitting a red light beam (633 nm) or a green light beam (543 nm).

A measuring laser beam S emitted from the light source is reflected by the surface of the optical lens 1 or 1' for interference with a reflected light from a flat reference plate contained in the interferometer. The resultant light is imaged by the CCD camera. A image signal from the CCD camera is processed by means of the computer system 7 in terms of image processing, so as to monitor the reflective wavefront on the lens plane 4 or 4'. The result of the monitoring may be displayed on a display device of the computer system 7.

A laser oscillator 8 is disposed between the optical lens 1 or 1' and the interferometer 5. A mirror 9 is movably arranged in front of the laser oscillator 8. The laser oscillator 8 includes, as a light source, an ultraviolet laser having a short wave of 110–220 nm. In the case of the optical lens having a coating of optical resin material 3 as shown in FIG. 1, it is preferable to use an excimer laser consisting of an ArF having a short wavelength of 193 nm. Contrariwise, in the case of the optical laser made from fused quarts as shown in FIG. 3, it is preferable to use a fluorine laser having a short wavelength of 153 nm. Hydrogen laser or the like may be also used. It is also possible to use, other than the above laser oscillator 8, another type of oscillator including, as a light source, an ultraviolet lamp such as an ArF ultraviolet lamp to emit ultraviolet rays. It is also noted that, when a light source providing a vacuum ultraviolet rays which tend to be significantly absorbed in air is used, the system in its entirety is placed in a container. In such a case, the container should be purged with Ar gas or vacuumed.

The mirror 9 includes a drive source 10 for permitting two-dimensional movement of the mirror 9 in a X-Y plane between the lens plane 4 or 4' and the interferometer 5. The drive source 10 is connected with the computer system 7 and controlled thereby.

In accordance with the method of the invention, the reflective wavefront of the lens plane 4 or 4' of the optical lens 1 or 1' is monitored. In accordance with the monitoring information, the lens plane 4 or 4' is etched in non-contact manner by means of a short wavelength, ultraviolet laser L or L' so to as to obtain a most appropriate shape of the reflective wavefront. In practice, the monitoring of the reflecting surface of the lens plane 4 or 4' is performed by means of the computer system 7 through the use of the interferometer 5 confronting to the lens plane 4 or 4'. The surface processing relative to the lens plane 4 or 4' is performed by the short wavelength, ultraviolet laser beam L or L' emitted from the laser oscillator 8. The short wave, ultraviolet laser beam L or L' is reflected by the mirror 9 onto the lens plane 4 or 4' for irradiation thereof. The short wave, ultraviolet laser beam L or L' may be irradiated onto the entire lens plane, since the mirror 9 is suitably displaced by the drive source 10 in X-Y direction.

More specifically, the measuring laser beam S emitted from the light source of the interferometer 5 is reflected by the surface of the optical lens 1 or 1'. The thus reflected light is imaged by the CCD camera of the interferometer 5. Then, image signals from the CCD camera are processed by the computer system 8 in terms of image processing, so that phase distribution obtained from interference fringe caused in the lens plane 4 or 4' may be indicated on the display of the computer system 7. Thus, the reflective wavefront may be monitored by the measuring laser beam S passing through the lens plane 4 or 4'.

The computer system 7 determines surface condition of the lens plane 4 or 4' based on the monitoring conducted relative to the reflective wavefront of the lens plane 4 or 4'. In order to form desired lens plane 4 or 4' based on the surface condition, the drive source 10 of the mirror 9 is controlled by an output from the computer system 7. On the other hand, the short wavelength, ultraviolet laser beam L or L' is irradiated onto the lens plane 4 or 4' through the mirror 9. By this, the optical resin material 3 of the lens plane 4 or the fused quarts of the lens plane 4' is etched In non-contact manner.

Since the short wavelength, ultraviolet laser beam L or L' is used as a light source, C—C bonds in polymeric material adjacent the surface of the optical resin material 3 are destroyed so as to cause destruction of polymer into monomer. It is also noted that splash of SiO2 In the surface of the fused quartz is caused, whereby the surface of the fused quartz may be smoothly processed after the etching process.

The etching operation using the short wavelength, ultraviolet laser beam L or L' is conducted by moving the mirror 9 over the entire area of the lens plane 4 or 4' by means of the drive source 10 under the control from the computer system 7. During such etching operation, each stop position of the mirror 9 is controlled in accordance with the monitoring information of the reflective wavefront of the lens plane 4 or 4', so that each position on the lens plane 4 or 4' to be etched by means of the irradiation of the short wavelength, ultraviolet laser beam L or L' may be appropriately determined. It is also noted that a quantity of irradiation, to be determined by a pulse number and a strength of the short wavelength, ultraviolet laser beam L or L', may be appropriately determined by controlling the travel speed of the mirror 9, so as to set the etching depth in the lens plane 4 or 4' at an optimum value. Thus, it is possible to correct the reflective wavefront of the lens plane 4 or 4', whereby a lens plane having a desired reflective wavefront may be formed.

When one lens plane 4 or 4' opposite to the interferometer 5 has been appropriately formed, the optical lens 1 is rotated about its vertical axis. Then, the opposite lens plane 4 or 4' may be processed in the manner mentioned above.

Although the above embodiments have been explained with regard to the case in which reflective wavefront of the lens plane 4 or 4' is monitored, the invention is not limited to such embodiments. That is to say, a transmissive wavefront of the lens plane 4 or 4' may be also monitored by disposing a mirror 6 at a position behind the optical lens 1 or 1', as shown in FIG. 2 or 4. It is also noted that the present invention is also applicable to an optical element simply consisting of an optical resin material. Furthermore, the optical lens 1 or 1', other than the mirror 9, may be moved through the use of a movable stage.

The invention is also applicable to various kinds of optical lenses, other than the optical lens which is used in a precision processing laser device for condensation of uniform light.

In accordance with the invention, the object to be processed is an optical plane consisting of a coating of an optical resin material which is applied to the surface of a matrix consisting of optical glass, or an optical plane of a matrix consisting of optical glass or fused quartz. Further, a transmissive wavefront or a reflective wavefront of the optical plane is monitored, so that the optical plane may be etched in non-contact manner by means of irradiation of short wavelength, ultraviolet ray based on the monitoring information. thus, improved optical characteristics having less optical strain may be obtained in an aspheric processing. Aspheric processing operation with high precision may be also realized. Furthermore, an optical plane having an optimum transmissive wavefront or reflective wavefront may be easily fabricated, by means of the short wavelength, ultraviolet ray which provides for smooth processing of the surface after etching.

We claim:

1. A method for forming an optical plane into a shape to provide a most appropriate transmissive wavefront or reflective wavefront, the optical plane being a coating of an optical resin material applied to the surface of a matrix of optical glass or fused quartz, said method comprising the steps of: monitoring the transmissive wavefront or reflective wavefront of said optical plane so as to provide monitoring information, and etching said optical plane by means of irradiation of short wavelength, ultraviolet ray in non-contact manner in accordance with said monitoring information.

2. A method for forming an optical plane into a shape to provide a most appropriate transmissive wavefront or reflective wavefront, the optical plane being a surface of a matrix of optical glass or fused quartz, said method comprising the steps of: monitoring the transmissive wavefront or reflective wavefront of said optical plane so as to provide monitoring information, and etching said optical plane by means of irradiation of short wavelength, ultraviolet ray in non-contact manner in accordance with said monitoring information.

3. An apparatus for processing an optical plane, the optical plane being a surface of a coating of optical resin material applied to a surface of a matrix of optical glass or fused quartz or a surface of a matrix of optical glass or fused quartz, said apparatus comprising:

a means for irradiating said optical plane with a measuring laser beam;

a means for imaging said measuring laser beam reflected from said optical plane;

a computer system for detecting a surface condition of said optical plane in accordance with phase distribution of interference fringe of the reflected wave of the measuring laser beam obtained by said imaging means;

a means for irradiating said optical plane with an etching laser beam;

a means for directing said etching laser beam to a predetermined position on said optical plane; and a means for driving said directing means in accordance with the information detected by said computer system in order to obtain a desired surface condition of said optical plane.

4. An apparatus for processing an optical plane, the optical plane being a surface of a coating of optical resin material applied to a surface of a matrix of optical glass or fused quartz or a surface of a matrix of optical glass or fused quartz, said apparatus comprising:

a means for irradiating said optical plane with a measuring laser beam;

a mirror disposed behind said optical plane for reflecting said measuring laser beam;

a means for imaging the measuring laser beam which has been transmitted through said optical plane, reflected by said mirror and again emerged from said optical plane;

a computer system for detecting a surface condition of said optical plane in accordance with phase distribution of interference fringe of the transmitted wave of the measuring laser beam obtained by said imaging means;

a means for irradiating said optical plane with an etching laser beam;

a means for directing said etching laser beam to a predetermined position on said optical plane; and a means for driving said directing means in accordance with the information detected by said computer system in order to obtain a desired surface condition of said optical plane.

5. A method for processing an optical plane, the optical plane being a surface of a coating of optical resin material applied to a surface of a matrix of optical glass or fused quartz or a surface of a matrix of optical glass or fused quartz, said method comprising the steps of:

irradiating said optical plane with a measuring laser beam;

imaging said measuring laser beam reflected from said optical plane;

detecting a surface condition of said optical plane by means of a computer system in accordance with phase distribution of interference fringe of the reflected wave of the measuring laser beam obtained by said imaging means;

irradiating said optical plane with an etching laser beam;

directing said etching laser beam to a predetermined position on said optical plane by means of a directing means; and driving said directing means in accordance with the information detected by said computer system in order to obtain a desired surface condition of said optical plane.

6. An optical element having an optical plane produced according to the process of claim 5.

7. A method for processing an optical plane, the optical plane being a surface of a coating of optical resin material applied to a surface of a matrix of optical glass or fused quartz or a surface of a matrix of optical glass or fused quartz, said apparatus comprising:

irradiating said optical plane with a measuring laser beam;

reflecting said measuring laser beam by means of a mirror disposed behind said optical plane;

imaging the measuring laser beam which has been transmitted through said optical plane, reflected by said mirror and again emerged from said optical plane;

detecting a surface condition of said optical plane by means of a computer system in accordance with phase distribution of interference fringe of the transmitted wave of the measuring laser beam obtained by said imaging means;

irradiating said optical plane with an etching laser beam;

directing said etching laser beam to a predetermined position on said optical plane by means of a directing means; and driving said directing means in accordance with the information detected by said computer system in order to obtain a desired surface condition of said optical plane.

8. An optical element having an optical plane produced according to the process of claim 7.

* * * * *

UNITED STATES PATENT AND TRADEMARK OFFICE
CERTIFICATE OF CORRECTION

PATENT NO. : 5,729,344
DATED : March 17, 1998
INVENTOR(S) : Takahisa Jitsuno, et al.

It is certified that error appears in the above-indentified patent and that said Letters Patent is hereby corrected as shown below:

On the title page:

Item [73], please add second Assignee's information to read as follows: -- Takahisa Jitsuno, Mino-shi, Japan. --

Signed and Sealed this

Sixteenth Day of June, 1998

*Attest:*

BRUCE LEHMAN

*Attesting Officer*     *Commissioner of Patents and Trademarks*